United States Patent
Cho

(10) Patent No.: US 11,613,230 B2
(45) Date of Patent: Mar. 28, 2023

(54) PASSENGER DETECTION APPARATUS AND METHOD

(71) Applicant: HYUNDAI MOBIS CO., LTD., Seoul (KR)

(72) Inventor: Chung Hoon Cho, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/380,602

(22) Filed: Jul. 20, 2021

(65) Prior Publication Data

US 2022/0024407 A1    Jan. 27, 2022

(30) Foreign Application Priority Data

Jul. 21, 2020   (KR) ........................ 10-2020-0090305

(51) Int. Cl.
*B60R 22/48*  (2006.01)
*B60W 50/14*  (2020.01)
*B60R 21/015* (2006.01)

(52) U.S. Cl.
CPC ........ *B60R 22/48* (2013.01); *B60R 21/01516* (2014.10); *B60R 21/01532* (2014.10); *B60R 21/01544* (2014.10); *B60W 50/14* (2013.01); *B60R 2022/4808* (2013.01); *B60W 2420/20* (2013.01); *B60W 2540/01* (2020.02)

(58) Field of Classification Search
CPC ........ B60R 21/01512; B60R 21/01544; B60R 2022/4808; B60W 50/14; B60W 2420/20; B60W 2540/01; B60N 2/002

USPC ............................................. 340/457, 457.1
See application file for complete search history.

(56) References Cited

U.S. PATENT DOCUMENTS

| | | | | |
|---|---|---|---|---|
| 7,053,759 | B2* | 5/2006 | Kennedy | B60R 21/01516 200/85 A |
| 2003/0196495 | A1* | 10/2003 | Saunders | B60R 21/01516 73/1.13 |
| 2007/0235243 | A1* | 10/2007 | Nathan | B60N 2/002 177/144 |
| 2008/0068149 | A1* | 3/2008 | Kennedy | B60N 2/002 340/457.1 |

FOREIGN PATENT DOCUMENTS

KR   10-2013-0021980 A   3/2013

* cited by examiner

*Primary Examiner* — Eric Blount
(74) *Attorney, Agent, or Firm* — NovoTechIP International PLLC

(57) ABSTRACT

A passenger detection apparatus may include: an SBR (Seat Belt Reminder) sensor unit having a plurality of SBR sensors installed in respective seats of a vehicle, and connected in parallel to one another; and a control unit configured to detect a combined resistance value of the SBR sensor unit, compare the detected combined resistance value to resistance values of a combined resistance table which is preset and stored in an internal memory, and determine that a passenger corresponding to each boarding zone of the combined resistance table is on board, when the detected combined resistance value is not included in a grey zone.

12 Claims, 12 Drawing Sheets

<4 cell-type switch structure>

<Equivalent resistance in case of SW On>

FIG.5

| A | | | | | | B | | | | | | C | | | | | | |
|---|---|---|---|---|---|---|---|---|---|---|---|---|---|---|---|---|---|---|
| Ra1 | Ra2 | Ra12 | Ra3 | Ra4 | Ra34 | RAth | Rb1 | Rb2 | Rb12 | Rb3 | Rb4 | Rb34 | RBth | Rc1 | Rc2 | Rc12 | Rc3 | Rc4 | Rc34 | RCth |
| 10 | 10 | 5 | 10 | 10 | 5 | 10 | 20 | 20 | 10 | 20 | 20 | 10 | 20 | 15 | 15 | 7.5 | 15 | 15 | 7.5 | 15 |

FIG.6

| ABC Board | GAEY ZONE | SBR Fault | | | GAEY ZONE | AC Board | GAEY ZONE | AB Board | GAEY ZONE | BC Board | GAEY ZONE | A Board | GAEY ZONE | C Board | GAEY ZONE | B Board |
|---|---|---|---|---|---|---|---|---|---|---|---|---|---|---|---|---|
| RABC | | SBR B Fault (RTH_B) | SBR C Fault (RTH_C) | SBR A Fault (RTH_A) | | RAC | | RAB | | RBC | | RA | | RC | | RB |

FIG.7A

| Board/Scenario | A | B | C | Resistance (Rth) | Resistance Value (ohm) |
|---|---|---|---|---|---|
| 1 | O | O | O | RABC | 4.615385 |
| 2 | O | O | × | RAB | 6.666667 |
| 3 | O | × | × | RA | 10 |
| 4 | × | O | O | RBC | 8.571429 |
| 5 | × | O | × | RB | 20 |
| 6 | × | × | O | RC | 15 |
| 7 | O | × | O | RAC | 6 |
| 8 | × | × | × | open | |

FIG.7B

|          | Fault in Path A ||  Fault in Path B ||  Fault in Path C ||
|----------|------|----------|------|-------|-------|----------|
|          | RA'  | RTH_A    | RB'  | RTH_B | RC'   | RTH_C    |
| R1 Fault | 15   | 5.454545 | 30   | 5     | 22.5  | 5.142857 |
| R2 Fault | 15   | 5.454545 | 30   | 5     | 22.5  | 5.142857 |
| R3 Fault | 15   | 5.454545 | 30   | 5     | 22.5  | 5.142857 |
| R4 Fault | 15   | 5.454545 | 30   | 5     | 22.5  | 5.142857 |

PASSENGER DETECTION APPARATUS AND METHOD

CROSS-REFERENCE TO RELATED APPLICATIONS

This application claims priority from and the benefit of Korean Patent Application No. 10-2020-0090305, filed on Jul. 21, 2020, which is hereby incorporated by reference for all purposes as if set forth herein.

BACKGROUND OF THE INVENTION

1. Field of the Invention

Exemplary embodiments of the present disclosure relate to a passenger detection apparatus and method, and more particularly, to a passenger detection apparatus and method which can detect a passenger in a rear seat of a vehicle by making up for an insufficient number of input/output ports of a controller (e.g. system ASIC), when the number of rear SBR (Seat Belt Reminder) sensors is increased.

2. Discussion of Related Art

In general, an SBR (Seat Belt Reminder) system refers to a system that checks whether a passenger is on board and wears a seat belt, and transfers the check information to a BCM (Body Control Module). When a passenger is on board but does not wear a seat belt, the BCM warns the passenger through an alarm.

FIG. 1 is a diagram illustrating an SBR device according to the related art. As illustrated in FIG. 1, an SBR mat 10 having an SBR sensor installed therein is mounted in a seat within a vehicle, and a BCM 40 determines whether a passenger 30 is on board, through the SBR mat 10, and determines whether the passenger 30 wears a seat belt, through a buckle switch 20. Based on the determination information, the BCM 40 warns the passenger 30 through a warning light or chime bell, when determining that the passenger 30 is on board but does not wear the seat belt.

FIG. 2 is a diagram illustrating the shape of a general SBR sensor. As illustrated in FIG. 2, the SBR sensor is placed at the top of foam of a seat cushion. When two thin film-type switches each having vertical symmetry are simultaneously pressed in case that a passenger is on board or a distributed load equal to or greater than a predetermined value is applied, the SBR sensor is turned on to sense that the passenger is on board. Therefore, since one SBR sensor can sense that a passenger is seated on one seat, a separate sensor needs to be attached to a seating portion of each rear seat on which a passenger can be seated, in order to determine whether the passenger is seated on the rear seat. For example, a sedan may have three rear seats on which passengers can be respectively seated.

However, when the number of rear SBR sensors is increased as described above, input/output ports of the existing controller (e.g. system ASIC), which has been used, may fall short. In this case, the controller needs to be changed to an advanced controller (e.g. system ASIC) having an increased number of input/output ports. That is, when the controller is changed to an advanced controller having an increased number of input/output ports, the number of wire harnesses, the length of the wire harnesses and a connector size may be increased to raise the manufacturing cost.

Therefore, there is a need for a method capable of increasing the number of rear SBR sensors without changing an existing controller (e.g. system ASIC).

The related art of the present disclosure is disclosed in Korean Patent Application Laid-Open No. 10-2013-0021980 published on Mar. 6, 2013 and entitled "System and Method of Passenger Detection and Seat Belt Reminder of Vehicle".

BRIEF SUMMARY OF THE INVENTION

Various embodiments are directed to a passenger detection apparatus and method which can detect a passenger in a rear seat of a vehicle by making up for an insufficient number of input/output ports of a controller (e.g. system ASIC), when the number of rear SBR (Seat Belt Reminder) sensors is increased.

In an embodiment, a passenger detection apparatus may include: an SBR sensor unit having a plurality of SBR sensors installed in respective seats of a vehicle, and connected in parallel to one another; and a control unit configured to detect a combined resistance value of the SBR sensor unit, compare the detected combined resistance value to resistance values of a combined resistance table which is preset and stored in an internal memory, and determine that a passenger corresponding to each boarding zone of the combined resistance table is on board, when the detected combined resistance value is not included in a grey zone.

When the detected combined resistance value is included in the grey zone of the combined resistance table, the control unit may consider that the detected combined resistance value is included in any one of the boarding zones on both sides of the corresponding grey zone, according to a preset method, and determine that a passenger is on board at the corresponding zone.

When the detected combined resistance value corresponds to a fault zone of the combined resistance table, the control unit may determine that a fault occurred in the SBR sensor of the corresponding seat, and output a warning through a warning output unit.

Each of the SBR sensors of the SBR sensor unit may have an internal switch serving as resistance, and be designed such that the detected combined resistance value varies depending on whether the switch of at least one SBR sensor among the plurality of SBR sensors is turned on.

The combined resistance table may include a combined resistance zone for sensing whether one passenger is seated on any one seat among the plurality of seats of the vehicle; a combined resistance zone for sensing whether passengers are seated on two or more seats, respectively, among the plurality of seats; a combined resistance zone for sensing whether passengers are seated on all the seats, respectively; and a combined resistance zone for sensing whether a fault occurred in any one SBR sensor among the SBR sensors installed in the respective seats.

The combined resistance table may further include a grey zone for error prevention between the respective zones.

In an embodiment, a passenger detection method may include: detecting, by a control unit of a passenger detection apparatus, a combined resistance value of an SBR sensor unit having a plurality of SBR sensors which are installed for respective seats of a vehicle and connected in parallel to one another; comparing, by the control unit, the detected combined resistance value to resistance values of a combined resistance table which is preset and stored in an internal memory; and determining, by the control unit, that a passenger corresponding to each board zone of the combined resistance table is on board, when the comparison result between the detected combined resistance value and the combined resistance table indicates that the detected combined resistance value is not included in a grey zone.

The passenger detection method may further include considering, by the control unit, that the detected combined resistance value is included in any one of boarding zones on both sides of the corresponding grey zone, according to a preset method, and determining that a passenger is on board in the corresponding zone, when the comparison result between the detected combined resistance value and the combined resistance table indicates that the detected combined resistance value is included in the grey zone.

The passenger detection method may further include determining, by the control unit, that a fault occurred in the SBR sensor of the corresponding seat, and outputting a warning, when the comparison result between the detected combined resistance value and the combined resistance table indicates that the detected combined resistance value corresponds to a fault zone.

Each of the SBR sensors connected in parallel to one another may have an internal switch serving as resistance, and be designed such that the detected combined resistance value varies depending on whether the switch of at least one SBR sensor of the plurality of SBR sensors is turned on.

The combined resistance table may include a combined resistance zone for sensing whether one passenger is seated on any one seat among the plurality of seats of the vehicle; a combined resistance zone for sensing whether passengers are seated on two or more seats, respectively, among the plurality of seats; a combined resistance zone for sensing whether passengers are seated on all the seats, respectively; and a combined resistance zone for sensing whether a fault occurred in any one SBR sensor among the SBR sensors installed in the respective seats.

The combined resistance table may further include a grey zone for error prevention between the respective zones.

In accordance with the embodiments of the present disclosure, the passenger detection apparatus and method may make up for an insufficient number of input/output ports of a controller (e.g. system ASIC) when the number of rear SBR sensors in a vehicle is increased, and thus detect a passenger in a rear seat.

Furthermore, the passenger detection apparatus and method may increase the number of rear SBR sensors without changing the existing controller which has been used. Therefore, it is possible to prevent an increase in manufacturing cost, compared to when the existing controller is changed to an advanced controller having an increased number of input/output ports.

BRIEF DESCRIPTION OF THE DRAWINGS

FIG. 5 is a table showing resistance values which are actually set for paths A, B and C, respectively, in order to promote understandings of the configurations of FIG. 4A to 4D.

FIG. 6 is a table showing combined resistances which are calculated according to the number of passengers on board and faults of SBR sensors, based on the equivalent circuits of the SBR sensors in FIG. 4.

FIGS. 7A and 7B are tables comparatively showing combined resistance values which are calculated in board zones and fault zones, respectively, by applying actual resistance values, in FIG. 6.

DETAILED DESCRIPTION OF THE INVENTION

Hereinafter, a passenger detection apparatus and method will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
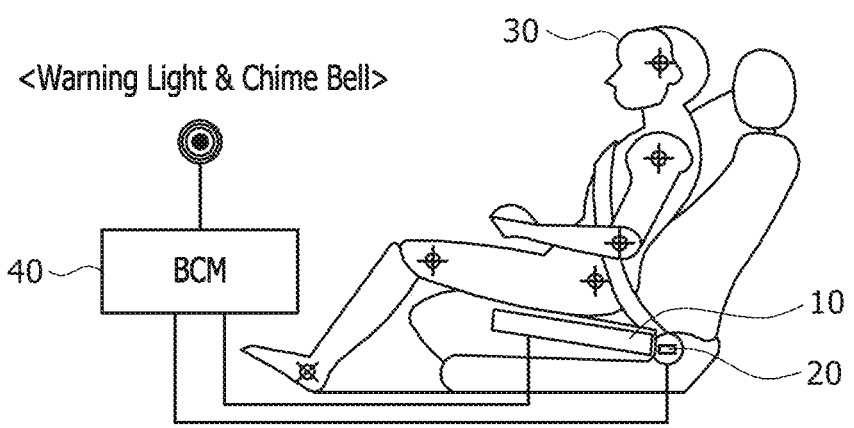
FIG. 1 is a diagram illustrating an SBR device according to the related art.
Figure 2:
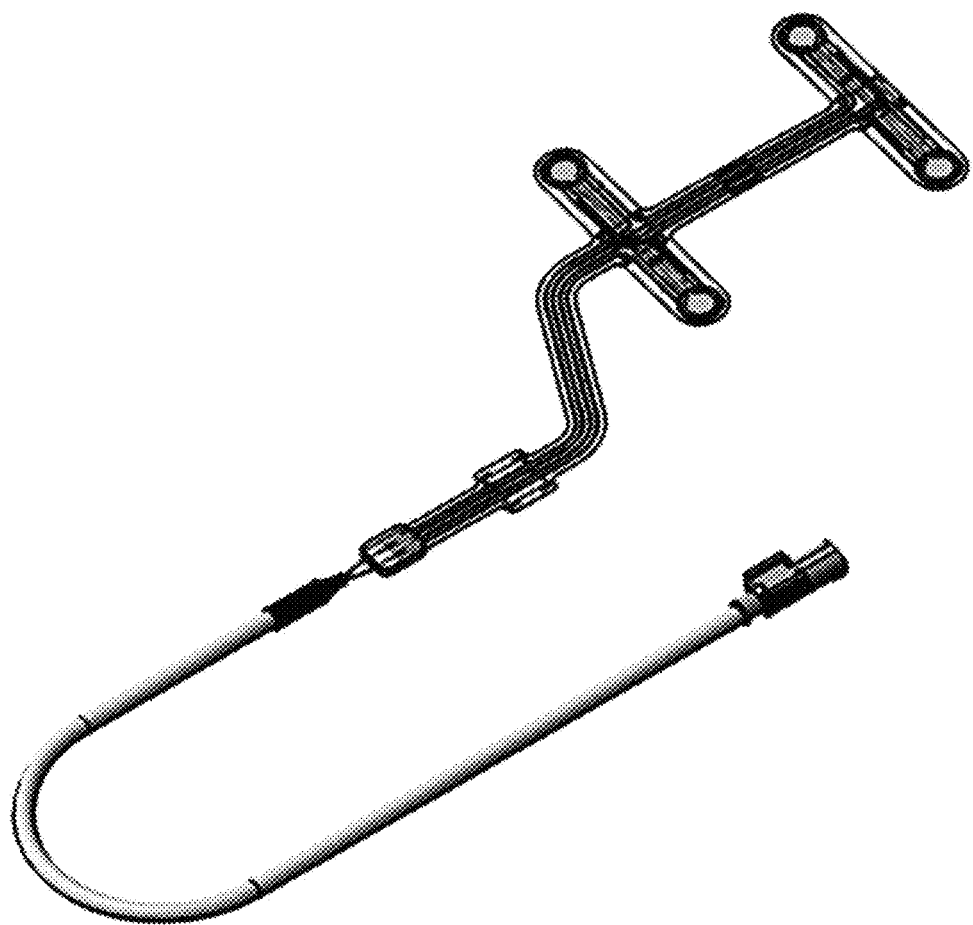
FIG. 2 is a diagram illustrating the shape of a general SBR sensor.
Figure 3:
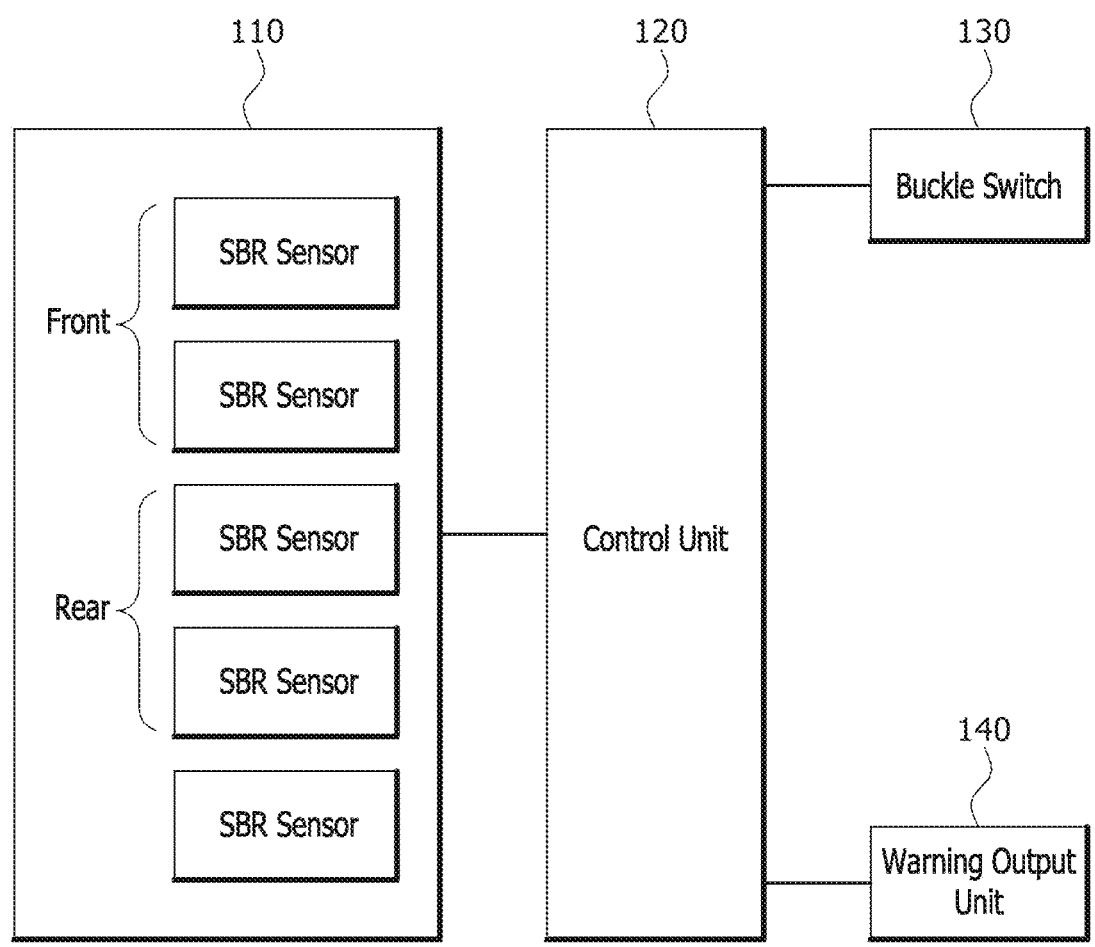
FIG. 3 is a diagram illustrating a schematic configuration of a passenger detection apparatus in accordance with an embodiment of the present disclosure.

FIG. 3 is a diagram illustrating a schematic configuration of a passenger detection apparatus in accordance with an embodiment of the present disclosure.

As illustrated in FIG. 3, the passenger detection apparatus in accordance with the embodiment of the present disclosure includes an SBR (Seat Belt Reminder) sensor unit 110, a control unit 120, a buckle switch 130 and a warning output unit 140.

The SBR sensor unit 110 includes a plurality of SBR sensors corresponding to a designated number of seats (e.g. two front seats and three rear seats in the case of a sedan).

The control unit 120 stores information on the SBR sensors in an internal memory (not illustrated), the SBR sensors being installed in designated seats, respectively, for each type of vehicle.

Furthermore, the control unit 120 calculates a resistance value based on a current acquired by the SBR sensor unit 110, senses whether a passenger is seated on each seat according to the calculated resistance value, and senses the state of each SBR sensor (e.g. the state in which only one switch of the SBR sensor is turned on).

The control unit 120 senses the state of the buckle switch 130 (or buckle sensor), for example, an on or off-state thereof.

The control unit 120 determines whether a passenger is seated on each seat, through the SBR sensor unit 110, the state of each SBR sensor (i.e. the state in which a passenger is seated on the corresponding seat), whether the passenger is correctly seated on the corresponding seat, based on the state of the buckle switch 130, and whether the passenger wears a seat belt.

Furthermore, the control unit 120 outputs a warning (e.g. correct seating warning or seat belt wearing warning) through the warning output unit 140 according to the determination results on whether the passenger is correctly seated on the corresponding seat and whether the passenger wears the seat belt.

As described above, the control unit 120 includes a limited number of input/output ports (e.g. a DCIF (DC sensor interface circuit)). For example, the control unit 120 includes input/output ports corresponding to two front SBR sensors. Therefore, when an increased number of SBR sensors (e.g. three rear SBR sensors) are included, the control unit 120 has no input/output ports which can connect all of the increased number of SBR sensors.

Therefore, in the present embodiment, the increased number of SBR sensors may be connected in parallel to one input/output port (see FIG. 4).

At this time, each of the SBR sensors is configured to have a resistor-type switch structure.

FIGS. 4A to 4D are diagrams illustrating equivalent circuits of a plurality of SBR sensors, which are connected in parallel to the equivalent circuits of the increased number of SBR sensors in FIG. 3.

Figure 4A:
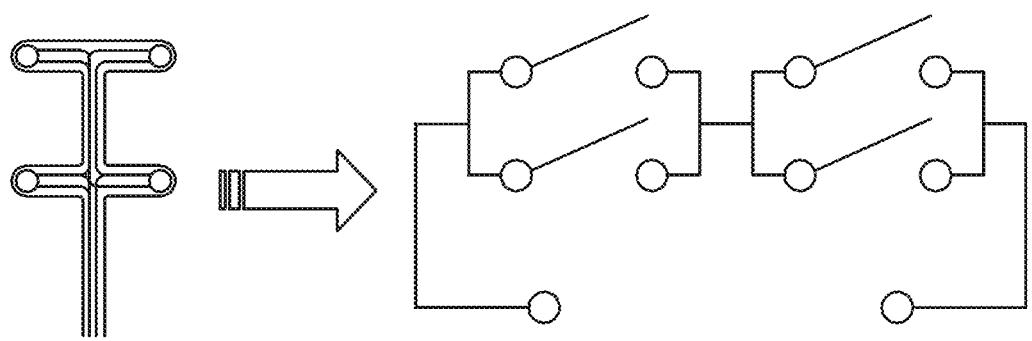
FIGS. 4A to 4D are diagrams illustrating equivalent circuits of a plurality of SBR sensors which are connected in parallel to equivalent circuits of an increased number of SBR sensors in FIG. 3.

Referring to FIG. 4A, each of the SBR sensors (4 cell-type SBR sensors) may include a plurality of parallel switches connected in series. At this time, when it is assumed that each of the switches is resistance, the SBR sensor may be illustrated as an equivalent circuit in which a plurality of parallel resistances are connected in series.

Figure 4B:
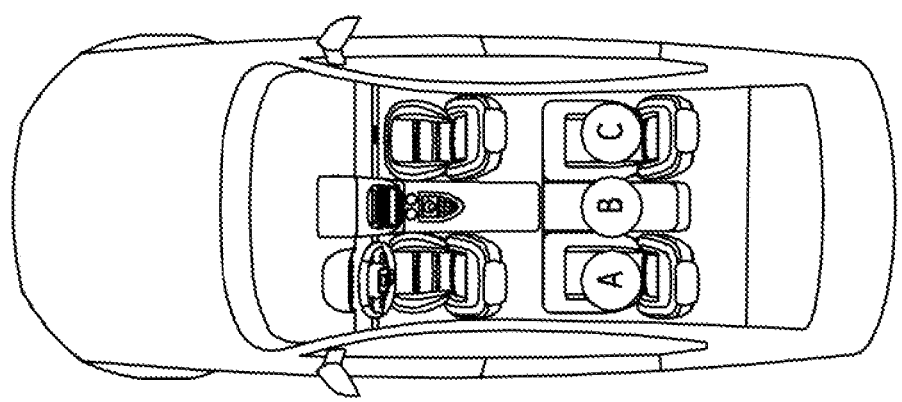
Figure 4C:
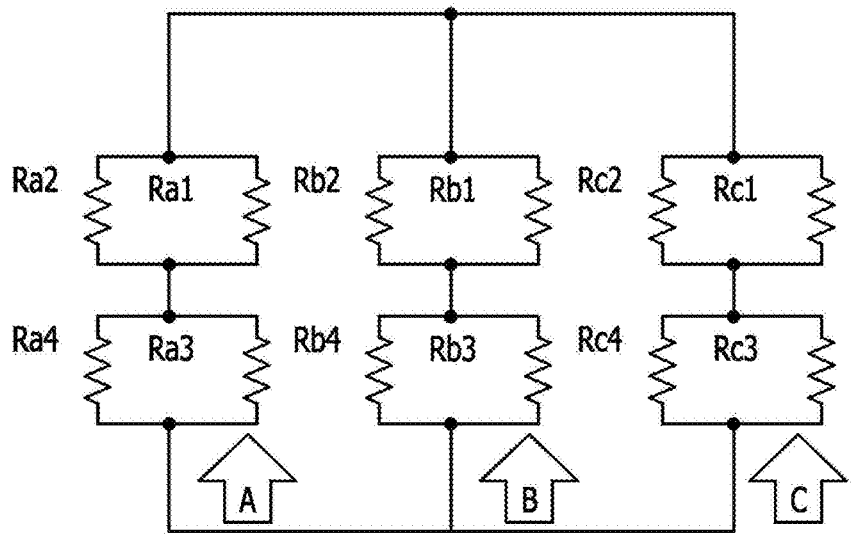

Furthermore, when it is assumed that the SBR sensors (e.g. A, B and C) are installed in three rear seats of the vehicle, respectively, as illustrated in FIG. 4B, the SBR sensors may be converted into equivalent circuits illustrated in FIG. 4C. Specifically, the SBR sensors may be illustrated as a circuit in which three equivalent circuits Ra1 to Ra4, Rb1 to Rb4 and Rc1 to Rc4 each having a plurality of parallel resistances connected in series are connected in parallel to one another.

Figure 4D:
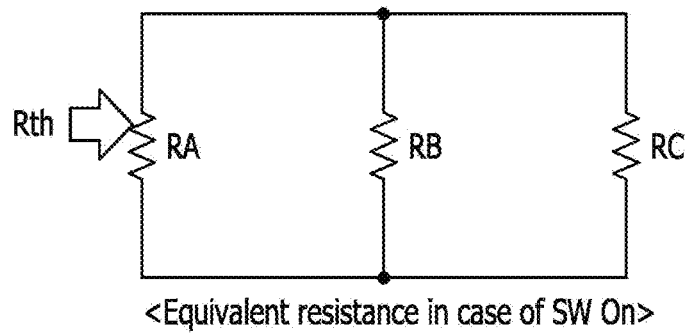

Furthermore, referring to FIG. 4D, the equivalent circuits Ra1 to Ra4, Rb1 to Rb4 and Rc1 to Rc4 corresponding to the respective SBR sensors (e.g. A, B and C) illustrated in FIG. 4C may be illustrated as a circuit in which equivalent resistances RA, RB and RC are connected in parallel to one another, the equivalent resistances RA, RB and RC each being combined into one resistance. At this time, the equivalent resistances RA, RB and RC may be combined again into a combined resistance Rth.

Referring back to FIG. 4C, the combined resistance of Ra1 and Ra2 becomes Ra12, the combined resistance of Ra3 and Ra4 becomes Ra34, the combined resistance of Rb1 and Rb2 becomes Rb12, the combined resistance of Rb3 and Rb4 becomes Rb34, the combined resistance of Rc1 and Rc2 becomes Rc12, and the combined resistance of Rc3 and Rc4 becomes Rc34.

Referring back to FIG. 4D, the combined resistance of Ra12 and Ra34 in a normal state becomes RAth, the combined resistance of Rb12 and Rb34 in a normal state becomes RBth, and the combined resistance of Rc12 and Rc34 in a normal state becomes RCth.

Furthermore, the combined resistance of Ra12 and Ra34 in case that a single fault occurred in a current path of Ra12 and Ra34 becomes RA', the combined resistance of Rb12 and Rb34 in case that a single fault occurred in a current path of Rb12 and Rb34 becomes RB', and the combined resistance of Rc12 and Rc34 in case that a single fault occurred in a current path of Rc12 and Rc34 becomes RC'. When a single fault occurred in any one of the current paths, the combined resistances become RTH_A, RTH_B and RTH_C, respectively.

In order to promote understandings, the present embodiment is based on the assumption that the resistance values of the respective paths A, B and C are set as shown in the table of FIG. 5, for convenience of description.

Referring to the table of FIG. 5, the combined resistance values of the SBR sensors in the respective paths A, B and C or the respective seats A, B and C are calculated through the following equations.

$$Ra12=Ra1\|Ra2=(Ra1*Ra2)/(Ra1+Ra2)$$

$$Ra34=Ra3\|Ra4=(Ra3*Ra4)/(Ra3+Ra4) \quad \text{[Path A]}$$

At this time, the combined resistance RA in case that a passenger is seated on the seat A by himself/herself is calculated as follows.

$$RA=Ra12+Ra34=(Ra1*Ra2)/(Ra1+Ra2)+(Ra3*Ra4)/(Ra3+Ra4)$$

Furthermore, the combined resistance RA' in case that a single fault occurred in any one switch (e.g. Ra4) of the path A and the combined resistance RTH_A of the entire circuit in case that a single fault occurred in the path A are calculated as follows.

$$RA'=(Ra1*Ra2)/(Ra1+Ra2)+Ra3$$

$$RTH\_A=Ra'\|RBC=\{(Ra1*Ra2)/(Ra1+Ra2)+Ra3\}$$

$$Rb12=Rb1\|Rb2=(Rb1*Rb2)/(Rb1+Rb2)$$

$$Rb34=Rb3\|Rb4=(Rb3*Rb4)/(Rb3+Rb4) \quad \text{[Path B]}$$

At this time, the combined resistance RB in case that a passenger is seated on the seat B by himself/herself is calculated as follows.

$$RB=Rb12+Rb34=(Rb1*Rb2)/(Rb1+Rb2)+(Rb3*Rb4)/(Rb3+Rb4)$$

Furthermore, the combined resistance RB' in case that a fault occurred in any one switch (e.g. Rb4) of the path B and the combined resistance RTH_B of the entire circuit in case that a single fault occurred in the path B are calculated as follows.

$$RB'=(Rb1*Rb2)/(Rb1+Rb2)+Rb3$$

$$RTH\_B=Rb'\|RAC=\{(Rb1*Rb2)/(Rb1+Rb2)+Rb3\}$$

$$Rc12=Rc1\|Rc2=(Rc1*Rc2)/(Rc1+Rc2)$$

$$Rc34=Rc3\|Rc4=(Rc3*Rc4)/(Rc3+Rc4) \quad \text{[Path C]}$$

At this time, the combined resistance RC in case that a passenger is seated on the seat C by himself/herself is calculated as follows.

$$RC=Rc12+Rc34=(Rc1*Rc2)/(Rc1+Rc2)+(Rc3*Rc4)/(Rc3+Rc4)$$

Furthermore, the combined resistance RC' in case that a single fault occurred in any one switch (e.g. Rc4) of the path C and the combined resistance RTH_C of the entire circuit in case that a single fault occurred in the path C are calculated as follows.

$$RC'=(Rc1*Rc2)/(Rc1+Rc2)+Rc3$$

$$RTH\_C=Rc'\|RAB=\{(Rc1*Rc2)/(Rc1+Rc2)+Rc3\}$$

Furthermore, the combined resistance RAB in case that passengers are seated on two seats (e.g. seats A and B), respectively, is calculated as follows.

$$RAB=RA\|RB=(Ra12+Ra34)\|(Rb12+Rb34)=$$

$$\{(Ra1*Ra2)/(Ra1+Ra2)+(Ra3*Ra4)/(Ra3+Ra4)\}\|$$

$$\{(Rb1*Rb2)/(Rb1+Rb2)+(Rb3*Rb4)/(Rb3+Rb4)\}$$

In this way, the combined resistances RAC and RBC in case that passengers are seated on other two seats (e.g. the seats A and C and the seats B and C), respectively, may be calculated.

Furthermore, the combined resistance RABC in case that passengers are seated on the entire three seats (e.g. A, B and C), respectively, may be calculated as follows.

$$RABC=\{RA\|RB\}\|RC=\{(Ra12+Ra34)\|(Rb12+Rb34)\}\|RC=$$

$$[\{(Ra1*Ra2)/(Ra1+Ra2)+(Ra3*Ra4)/(Ra3+Ra4)\}\|$$

$$\{(Rb1*Rb2)/(Rb1+Rb2)+(Rb3*Rb4)/(Rb3+Rb4)\}]\|RC$$

At this time, the above-described combined resistances may be changed according to the resistance values Ra1 to Ra4, Rb1 to Rb4 and Rc1 to Rc4 of the SBR sensors in the respective paths A, B and C or the respective seats A, B and C. Therefore, the calculated combined resistances corresponding to the resistance values Ra1 to Ra4, Rb1 to Rb4 and Rc1 to Rc4 of the SBR sensors may be summarized as shown in the table of FIG. 6.

At this time, the resistance values Ra1 to Ra4, Rb1 to Rb4 and Rc1 to Rc4 of the SBR sensors are set so that the respective combined resistances have different values from each other.

FIG. 6 is a table showing combined resistances which are calculated according to the number of passengers on board and faults of the SBR sensors, based on the equivalent circuits of the SBR sensors in FIG. 4.

Referring to FIG. 6, the table includes the combined resistances RA, RB and RC for sensing whether one passenger is seated on any one of the seats A, B and C, the combined resistances RAB, RBC and RAC for sensing whether passengers are seated on two or more seats, respectively, among the seats A, B and C, the combined resistance RABC for sensing whether passengers are seated on all the seats A, B and C, respectively, the combined resistances RTH_A, RTH_B and RTH_C for sensing whether a fault occurred in any one of the SBR sensors installed in the respective seats A, B and C, and a grey zone GREY ZONE for error prevention is included between the respective combined resistances for sensing whether the passengers are on board.

That is, the combined resistances have different values, and the resistance values Ra1 to Ra4, Rb1 to Rb4 and Rc1 to Rc4 of the SBR sensors are set so that the grey zone GREY ZONE for error prevention is included between the respective combined resistances.

When the value of a combined resistance is included in a grey zone, the combined resistance is decided as any one of the combined resistances on both sides of the corresponding grey zone according to a preset method, in order to detect a passenger. For example, when a combined resistance value is detected in the grey zone between a boarding zone A and a boarding zone C in FIG. 6, the control unit 120 may determine that a passenger is seated on the seat A or the seat C according to the preset method. For example, the resistance value of the boarding zone closer to the center of the grey zone may be included as the combined resistance value.

FIGS. 7A and 7B are tables comparatively showing combined resistance values which are calculated in boarding zones and fault zones by applying actual resistance values, in FIG. 6.

FIG. 7A shows that the combined resistances RA, RB and RC for sensing whether one passenger is seated on each of the seats A, B and C, the combined resistances RAB, RBC and RAC for sensing whether passengers are seated on two or more seats, respectively, among the seats A, B and C, and the combined resistance RABC for sensing whether passengers are seated on all the seats A, B and C, respectively, are sensed as different resistance values, respectively.

FIG. 7B shows that the combined resistances RTH_A, RTH_B and RTH_C for sensing whether a fault occurred in any one SBR sensor among the SBR sensors installed in the respective seats A, B and C or the respective paths A, B and C are sensed as different resistance values, respectively. At this time, although a fault occurs in certain switches among the seats A, B and C or the paths A, B and C, the combined resistance values may be sensed as the same resistance values in case of a single fault.

Figure 8:
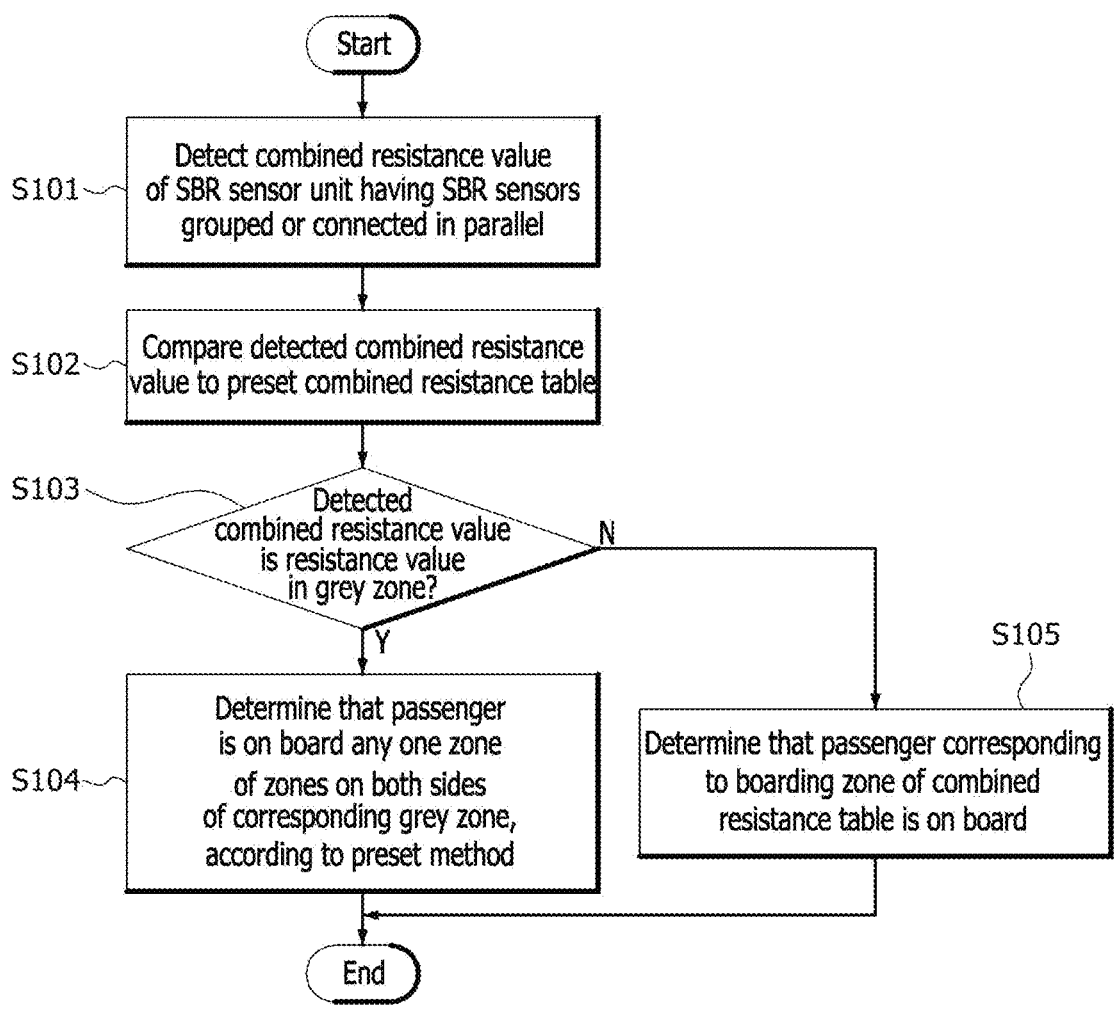
FIG. 8 is a flowchart for describing a passenger detection method in accordance with an embodiment of the present disclosure.

FIG. 8 is a flowchart for describing a passenger detection method in accordance with an embodiment of the present disclosure.

Referring to FIG. 8, the control unit 120 detects or senses a combined resistance value of the SBR sensor unit 110 in which the plurality of SBR sensors installed in the respective seats A, B and C of a vehicle are grouped or connected in parallel, in step S101.

At this time, each of the grouped SBR sensors has an internal switch serving as resistance, and is designed in advance such that, according to whether the switch (i.e. resistance) of a certain SBR sensor among the plurality of SBR sensors is turned on, the resistance value of the detected combined resistance (i.e. combined resistance value) is changed. That is, the combined resistances have different values, and the resistance values of the SBR sensors are designed so that the grey zone GREY ZONE for error prevention is included between the respective combined resistances.

Thus, the control unit 120 compares the detected combined resistance value and a resistance value of a combined resistance table which is preset and stored in an internal memory (not illustrated), in step S102.

At this time, the combined resistance table includes the combined resistances RA, RB and RC for sensing whether one passenger is seated on any one of the seats A, B and C, the combined resistances RAB, RBC and RAC for sensing whether passengers are seated on two or more seats, respectively, among the seats A, B and C, the combined resistance RABC for sensing whether passengers are seated on all the seats A, B and C, respectively, and the combined resistances RTH_A, RTH_B and RTH_C for sensing whether a fault occurred in any one of the SBR sensors installed in the respective seats A, B and C, and the grey zone GREY ZONE for error prevention is included between the combined resistances for sensing whether the passengers are on board.

When the comparison result between the detected combined resistance value and the combined resistance table indicates that the detected combined resistance value is included in a grey zone (Yes in step S103), the control unit 120 considers that the combined resistance value is included in any one of the zones on both sides of the corresponding grey zone, according to the preset method, and determines that a passenger is on board at the corresponding zone, in step S104.

Furthermore, when the comparison result between the detected combined resistance value and the combined resistance table indicates that the detected combined resistance value is not included in the grey zone (No in step S103), the control unit 120 determines that a passenger corresponding to each boarding zone (e.g. one-passenger boarding zone, two-passengers boarding zone or three-passengers boarding zone) of the combined resistance table is on board, in step S105.

At this time, although not illustrated in the drawing, when the comparison result between the detected combined resistance value and the combined resistance table may indicate that the detected combined resistance value corresponds to a fault zone, the control unit 120 may determine that a fault occurred in the SBR sensor of the corresponding seat, and output a warning.

As described above, the passenger detection apparatus and method in accordance with the embodiments of the present disclosure may make up for an insufficient number of input/output ports of a controller (e.g. system ASIC) when the number of rear SBR sensors in a vehicle is increased, which makes it possible to increase the number of rear SBR sensors without changing the existing controller which has been used. Therefore, it is possible to prevent an increase in manufacturing cost, compared to when the existing controller is changed to an advanced controller having an increased number of input/output ports.

Although the present disclosure has been disclosed with reference to the embodiments illustrated in the drawings, the embodiments are only for illustrative purposes, and those skilled in the art will appreciate that various modifications and other equivalent embodiments are possible therefrom. Thus, the technical scope of the present disclosure should be defined by the following claims. Furthermore, the embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The process may include a component for communicating with another device.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A passenger detection apparatus comprising:
   a seat belt reminder (SBR) sensor unit comprising a plurality of SBR sensors disposed respectively at a plurality of seats of a vehicle and connected in parallel; and
   a control unit configured to:
      detect a combined resistance value of the plurality of SBR sensors;
      compare the detected combined resistance value to a plurality of preset resistance values of a combined resistance table stored in a data storage; and
      determine that a passenger corresponding to each of a plurality of boarding zones of the combined resistance table is on board when the detected combined resistance value is outside a grey zone between the preset resistance values of the combined resistance table.

2. The passenger detection apparatus of claim 1, wherein, when the detected combined resistance value is within the grey zone of the combined resistance table, the control unit considers that the detected combined resistance value is within any one of the plurality of boarding zones on both sides of the corresponding grey zone, and determines that a passenger is on board at the corresponding boarding zone.

3. The passenger detection apparatus of claim 1, wherein, when the detected combined resistance value corresponds to a fault zone of the combined resistance table, the control unit determines that a fault occurred in the SBR sensor of the corresponding seat, and outputs a warning through a warning output unit.

4. The passenger detection apparatus of claim 1, wherein each SBR sensor comprises an internal switch serving as a resistance and is configured such that the detected combined resistance value varies depending on whether the switch of any of the plurality of SBR sensors is turned on.

5. The passenger detection apparatus of claim 1, wherein the combined resistance table comprises:
   a first combined resistance zone for sensing whether one passenger is seated on any of the plurality of seats;
   a second combined resistance zone for sensing whether two or more passengers are seated on two or more seats of the plurality of seats, respectively;
   a third combined resistance zone for sensing whether a plurality of passengers is seated on all of the plurality of seats, respectively; and
   a fourth combined resistance zone for sensing whether a fault occurred in any of the SBR sensors.

6. The passenger detection apparatus of claim 5, wherein the combined resistance table further comprises the grey zone for error prevention between the respective combined resistance zones.

7. A method for detecting passengers using a seat belt reminder (SBR) sensor unit comprising a plurality of SBR sensors disposed respectively at a plurality of seats of a vehicle and connected in parallel, the method comprising:
   detecting a combined resistance value of the plurality of SBR sensors;
   comparing the detected combined resistance value to a plurality of preset resistance values of a combined resistance table; and
   determining that a passenger corresponding to each of a plurality of board zones of the combined resistance table is on board when the detected combined resistance value is outside a grey zone between the preset resistance values of the combined resistance table.

8. The method of claim 7, further comprising considering that the detected combined resistance value is included in any of boarding zones on both sides of a corresponding grey zone, and determining that a passenger is on board in the corresponding zone when the comparison result between the detected combined resistance value and the combined resistance table indicates that the detected combined resistance value is within the grey zone.

9. The method of claim 7, further comprising determining that a fault occurred in the SBR sensor of the corresponding seat, and outputting a warning when the comparison result between the detected combined resistance value and the combined resistance table indicates that the detected combined resistance value corresponds to that of a fault zone of the combined resistance table.

10. The method of claim 7, wherein each SBR sensor comprises an internal switch serving as a resistance and configured such that the detected combined resistance value varies depending on whether the switch of at least one of the plurality of SBR sensors is turned on.

11. The method of claim 7, wherein the combined resistance table comprises:
- a first combined resistance zone for sensing whether one passenger is seated on any of the plurality of seats;
- a second combined resistance zone for sensing whether two or more passengers are seated on two or more seats of the plurality of seats, respectively;
- a third combined resistance zone for sensing whether a plurality of passengers is seated on all of the plurality of the seats, respectively; and
- a fourth combined resistance zone for sensing whether a fault occurred in any of the SBR sensors.

12. The method of claim 11, wherein the combined resistance table further comprises a region within the grey zone for error prevention between the respective combined resistance zones.

\* \* \* \* \*